United States Patent [19]
Borenius et al.

[11] Patent Number: 6,092,415
[45] Date of Patent: Jul. 25, 2000

[54] METHOD AND DEVICE FOR MONITORING THE TIRE AIR PRESSURE OF THE WHEELS OF AN AUTOMOBILE

[75] Inventors: Gunnar Borenius, Aichwald; Fritz Braun, Kernen; Heiko Gruenberg, Otze, all of Germany

[73] Assignee: DaimlerChrysler AG, Germany

[21] Appl. No.: 09/257,243

[22] Filed: Feb. 25, 1999

[30] Foreign Application Priority Data

Feb. 25, 1998 [DE] Germany ............................ 198 07 880

[51] Int. Cl.$^7$ ............................ B60C 23/02; B60C 23/00
[52] U.S. Cl. ........................ 73/146.2; 340/442; 73/146.5
[58] Field of Search .................... 73/146, 146.2, 73/146.3, 146.5; 340/442–448

[56] References Cited

U.S. PATENT DOCUMENTS

| 5,747,686 | 5/1998 | Nishihara et al. | 73/146.2 |
| 5,826,207 | 10/1998 | Ohashi et al. | 701/36 |
| 5,913,240 | 6/1999 | Drahne et al. | 73/146 |

FOREIGN PATENT DOCUMENTS

| 43 27 492 C1 | 8/1993 | Germany . |
| 44 00 913 A1 | 7/1995 | Germany . |

*Primary Examiner*—Harshad Patel
*Assistant Examiner*—Abdullahi Aw-Musse
*Attorney, Agent, or Firm*—Evenson, McKeown, Edwards & Lenahan, P.L.L.C.

[57] ABSTRACT

In a method for monitoring tire air pressure of the wheels of an automobile, longitudinal force of the tires-slip test data pairs are measured and recorded for at least one wheel, while the automobile is being driven. A corresponding evaluation unit determines a compensation curve for the recorded longitudinal force of the tires-slip test data pairs, along with an associated offset value based on a zero point in a longitudinal force of the tires-slip performance graph. From the offset value, the respective wheel radius relationship between at least one driven and one non-driven wheel can be calculated, and from this the relative tire pressure of the wheels can be determined.

12 Claims, 3 Drawing Sheets

METHOD AND DEVICE FOR MONITORING THE TIRE AIR PRESSURE OF THE WHEELS OF AN AUTOMOBILE

BACKGROUND AND SUMMARY OF THE INVENTION

This application claims the priority of German application No. 198 07 880.3, filed Feb. 25, 1998, the disclosure of which is expressly incorporated by reference herein.

The invention relates to a method and device for monitoring the tire air pressure of wheels of an automobile, in particular to a method and device, with which at least for some of the automobile's wheels the tire air pressure (tire pressure) is indirectly measured (rather than directly) via a corresponding tire air pressure sensor.

German patent document DE 43 27 492 C1 discloses various processes and devices for the indirect determination of the tire pressure of vehicle wheels. In these processes and devices, the measurement of the tire pressure is most often limited to very specific conditions, in particular situations which are free of the application of propulsive power. Thus, in the tire pressure warning system disclosed in German patent document DE 43 27 492 C1, the tire pressure is indirectly derived from an adjustment of the number of revolutions of the wheel and a corresponding wheel revolutions scaling factor. The number of wheel revolutions is measured only when the torque is below a predetermined torque boundary value and when specific other conditions are fulfilled. Specifically, with this process only such driving conditions in which the vehicle rolls somewhat free of the application of propulsive power and without noticeable cornering effects are addressed. This method may lead to a situation where, on inclines or during prolonged highway motoring at higher speeds, i.e., when propulsive powers are permanently applied, tire pressure monitoring does not occur.

German patent document DE 44 00 913 A1 discloses a method and a device of the type previously mentioned. In this process, the speeds of the wheel's revolutions are measured to determine the loss of air pressure in a tire of a driven wheel, and from this measurement the slip values for the driven wheels are computed. In addition, the respective propulsive powers of the wheels are determined and placed into a relation with the slip values as force-slip test data pairs. From the test data pairs, a compensation curve, preferably in the form of a linear regression curve, is determined. The tire pressure is determined from the slope of the straight line regression, and in particular with an increasing slope of the characteristic curve, a loss of tire pressure is indicated.

It is an object of the invention to provide a method and a device for monitoring and determining the tire pressure of automobile wheels at relatively limited costs (indirectly and possibly continuously), in particular during driving conditions when propulsive forces are applied to the wheels of the vehicle.

This and other objects and advantages are achieved by the method and apparatus according to the invention, in which for at least one driven wheel, the slip and the longitudinal force of the tires (also called the tire's axial force) are determined in the form of respective longitudinal force of the tires-slip test data pairs. At least for a selected part of the gathered test data pairs, a compensation curve is determined as well as its offset value with regard to the zero point in the longitudinal force of the tires-slip performance graph. From this offset value, the corresponding wheel radius relationship between at least one driven and one non-driven wheel is deduced, and from this the relative tire air pressure of the wheels is determined.

Because the information necessary to determine the slip and longitudinal force of the tires (for example, via the number of wheel revolutions, engine speed and torque as well as driving speed) is already present in modern automobiles (for example, in an anti-lock braking system (ABS)), this process can be realized with a relatively limited effort. Moreover, with this system, relative tire pressure information between one driven and one non-driven wheel is gathered without utilizing a pressure sensor.

In an embodiment of the method according to the invention, specifically those longitudinal forces of the tires-slip test data pairs which reside in the micro-slip range are examined. In this range, the functional connection between the longitudinal force of the tires and the slip, according to experience, approximates a linear relationship which facilitates the use of a straight line as the compensation curve. The latter can be defined with the help of two test data pairs, or as a straight line regression for more than two test data pairs.

In another embodiment of the method according to the invention, the relative determination of tire pressure occurs for the pair of wheels on the same side of the vehicle, as well as for the wheels situated diagonally opposed from each other, by means of which a higher degree of certainty of determining the tire air pressure is attained.

In yet another embodiment of the method according to the invention, on at least one wheel the absolute tire air pressure is measured directly with an assigned pressure sensor, and is used as a reference value for the relative tire pressure value, which is determined for at least one other wheel. With this arrangement, it is thus possible (for example, by using only one pressure sensor on one wheel) to determine the absolute tire pressure for all the wheels of an automobile.

In still a further embodiment of the method according to the invention, the slope of the compensation curve is also calculated, and from this the existing wheel load is determined.

An embodiment of the device according to the invention is specifically suitable for directly measuring the absolute tire pressure with an assigned pressure sensor.

Other objects, advantages and novel features of the present invention will become apparent from the following detailed description of the invention when considered in conjunction with the accompanying drawings.

DETAILED DESCRIPTION OF THE DRAWINGS

Figure 1:
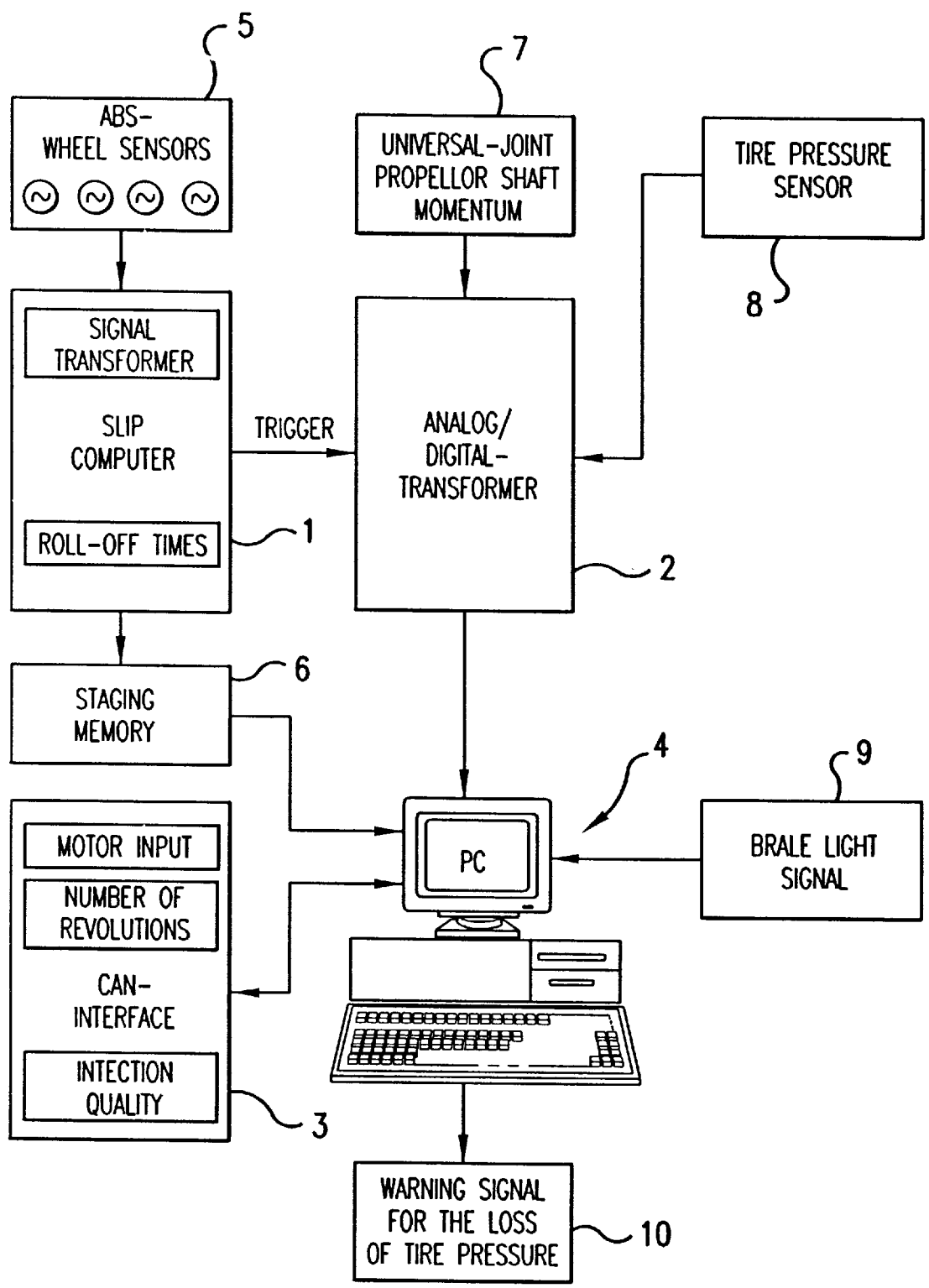
FIG. 1 is a block diagram of a device for monitoring tire pressure for the wheels of an automobile.

FIG. 1 shows a device for monitoring tire air pressure (tire pressure) of the wheels of an automobile which is equipped with an anti-lock braking system. The determination of tire pressure occurs, for at least one wheel, indirectly via the recorded longitudinal force of the tires-slip test data pairs.

The method employed for this purpose is based on the following considerations and definitions. Slip $\lambda$ is defined as the relationship of the difference of the wheel's circumferential speed between a driven and a non-driven wheel to the circumferential speed of the driven wheel. With the designation $r_a$ for the radius of the driven wheel, $r_n$ for the radius of the non-driven wheel, $t_a$ for the duration of a revoluion of the driven wheel and $t_n$ for the duration of a revolution of the non-driven wheel, the relationship for the slip $\lambda$ is $$\lambda = 1 - kt_a/t_n,$$

where the so-called calibration factor (i.e., $k=r_n/r_a$) describes the wheel radius relationship of the non-driven wheel to the driven wheel. Alternatively, other similar definitions of the slip $\lambda$ are current, whereby (in every case) the calibration factor k is introduced into the relationship in addition to the duration of the revolutions $t_a$, $t_n$.

Because, by definition, the slip $\lambda$ at the driven wheel should equal zero when no propulsive force is applied, the characteristic curve for the longitudinal force of the tires-slip should pass through the zero point of the longitudinal force of the tires-slip performance graph. A deviation from this rule indicates a faulty determination of the true slip (i.e., the slip which is determined by the propulsive force and with it the longitudinal force of the tires), as a result of faulty assumptions regarding the radii $r_a$, $r_n$ of the relevant wheels (i.e., the calibration factor k). As a result, with the help of the offset value of the characteristic curve for the longitudinal force of the tires-slip (in the form of its slip value when the longitudinal force of the tires equals zero, for example), a new calibration factor k can be determined. When this calibration factor is used in the relationship described above (for the slip 1), the characteristic curve of the longitudinal force of the tires-slip will then pass through the performance graph's zero point as desired. The newly determined calibration actor now reflects the true relationship between the tires' radii. Because the latter is directly dependent upon the relative tire pressure of the wheels involved, the newly determined calibration factor can thus be used to determine the relative tire pressure of these wheels, which in particular makes it possible to recognize a disproportionate loss of pressure on one of the wheels in a timely manner.

While most prior art procedures measure the tire pressure indirectly from the number of revolutions of the wheel or via the tire angular speed measurement (when propulsive forces are absent), with the method according to the present invention, driving conditions when the propulsive force is different than zero are also considered. In essence, the greater the range in which the corresponding test data pairs for the slip and longitudinal force of the tires are collected, the more dependable the measurement of the characteristic curve of the longitudinal force of the tires-slip. While the prior art methods ignore conditions when the propulsive force and slip deviate, such deviations, in the method according to the invention, improve the precision of the new determination of the calibration factor, and with it the precision with which the relative tire pressure of the wheels is measured.

The device in FIG. 1 is suitable for use with the method in accordance with the invention. It is comprised of four networked individual computers, specifically a slip computer 1, an intelligent analog/digital transformer 2, an intelligent interface card 3 for capturing engine data of the automobile engine and a master computer 4, which acts as the evaluation unit for the collected test data. The master computer or interpreting computer 4, is dimensioned such that it can be integrated into the vehicle's electronics (in an automobile or in another type of motor vehicle) without problems and in conjunction with the other components necessary for the method. The slip computer 1 evaluates the output signal of an anti-lock braking system's wheel revolution sensor system 5 to determine the roll-off time of a revolution of the wheel, i.e., the time of one revolution of the vehicle's wheels. The roll-off times can he directly calculated with great precision when taking into account the current roll radius relationships, i.e., the calibration factor k. The slip computer 1 directly forwards the determined values via a staging storage 6 to the master computer 4.

For recording the longitudinal force of the tires, a universal joint propeller shaft momentum sensory mechanism 7 is provided, which records the universal joint propeller shaft's momentum (with the help of a wire strain gauge) and forwards it to the master computer 4 via the analog/digital transformer 2. Here, the longitudinal force of the tires is determined via the sensed universal propeller shaft's momentum while knowing the differential gear ratio and the static roll-off radius, in which it is assumed that the distribution of the momenta of the differential gear always remain constant. For reasons of functionality, the digitized propeller shaft momentum values, which are received for every revolution of the wheel, are averaged in order to determine the force value of each revolution of the wheel. Concurrently, the interface card 3 transmits data regarding current values for the momentum of the engine, the number of engine revolutions and the injection quantity to the master computer 4, and with the help of this data the master computer 4 can indirectly determine the longitudinal force of the tires.

Determining the wheel's propulsive force, and with it the longitudinal force of the tires, from the momentum of the engine requires knowledge about the current gear ratio. The latter can be deduced from the roll-off time of the driven wheels, which has been determined by the slip computer 1, and the respective engine revolution information. Thus, the longitudinal force of the tires is determined independently in two different ways, to increase the precision for measuring the longitudinal force of the tires (by averaging the data or by providing a redundancy, for example). Should the indirect determination of the longitudinal force of the tires, via engine data from the interface card 3, prove to be sufficiently accurate and reliable, then if necessary the universal joint propeller shaft's momentum sensory system 7 can be eliminated. Conversely, in cases where the interface card 3 is not present, the longitudinal force of the tires can be determined solely by the universal joint propeller shaft's momentum sensory system 7.

Optionally, a tire pressure sensory mechanism 8 with which the tire pressure of some of the vehicle's wheels is measured in absolute terms, for example, on exactly one wheel can be used. The pressure sensory mechanism 8 sends the corresponding pressure information to the master computer 4 via the analog/digital transformer 2. The pressure sensory mechanism 8 may be employed at all times to measure the absolute tire pressure on at least one wheel such that this absolute pressure value may serve as a reference value with which the absolute tire pressure may be derived for the remaining wheels on the basis of the relative tire pressure which was determined as described above. As a result, it is possible to determine the absolute tire pressure of all wheels by employing a pressure sensor on only one wheel.

Alternatively, the tire pressure sensory mechanism 8 can also be employed to check, or respectively calibrate, the relative tire pressure measurements based on the longitudinal force of the tires-slip measurements, either at the beginning or from time to time. This is accomplished by determining the tire pressure for one or more wheels both indirectly and relatively (via the longitudinal force of tires-slip determination), as well as directly and absolutely (via the tire pressure sensory mechanism 8). For these methods, an additional air pressure control unit can be provided with which the tire pressure can be changed in a defined way, and which transmits the corresponding information to the master computer 4.

In order for the master computer 4 to recognize driving conditions during braking, it is supplied by the brake light signal unit 9 with corresponding brake light signal information. The master computer is configured such that it can recognize, in a timely manner, a loss of tire pressure in one of the vehicle's wheels, and in this case, send a standard acoustic or optical warning signal 10.

Figure 2:
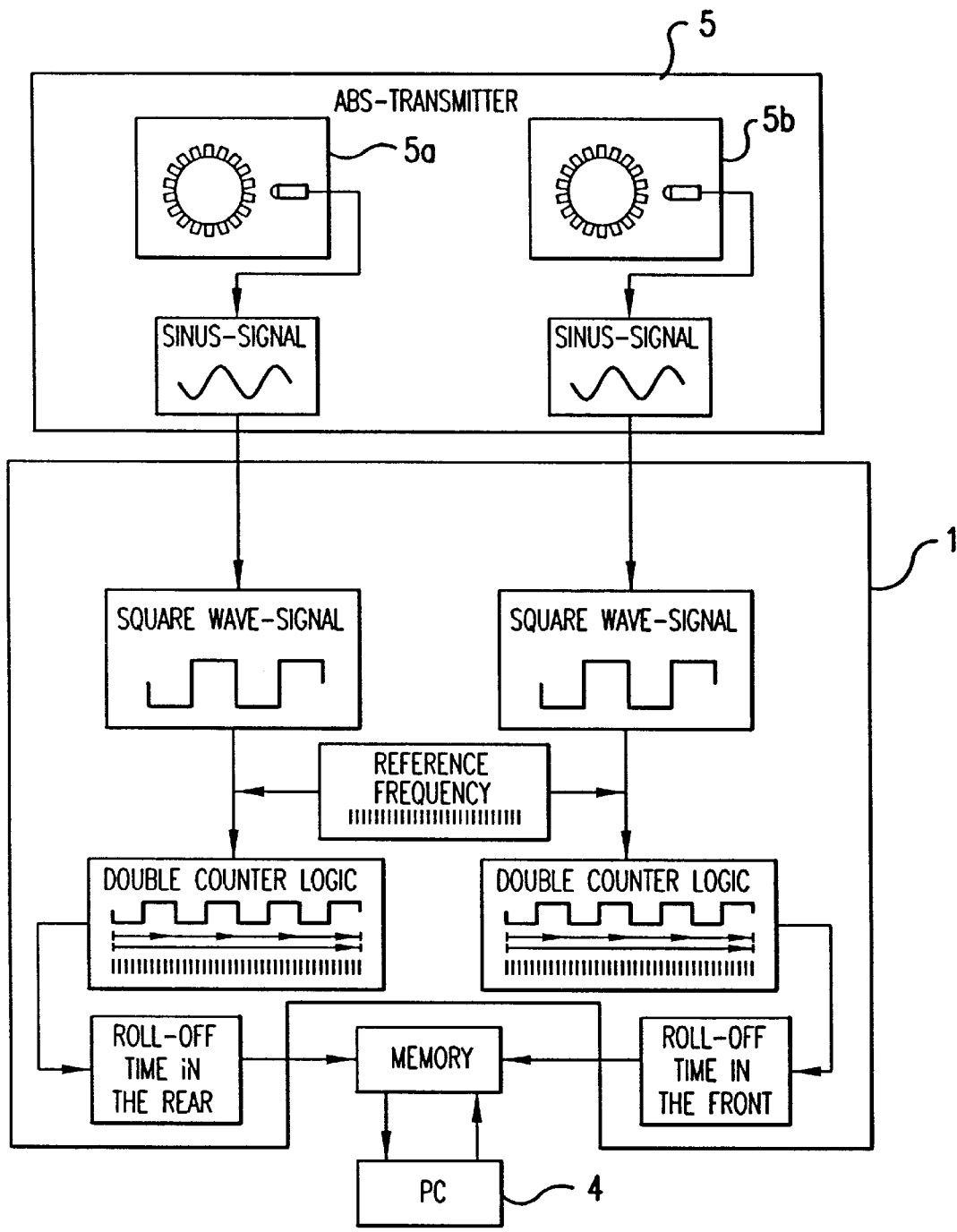
FIG. 2 is a detailed block diagram of a slip computer used in FIG. 1.

The slip λ is determined with a great deal of precision via the slip computer 1, that reliable test data pairs for longitudinal force of the tires and slip can be recorded in the micro-slip range, i.e., with slip values that are smaller than approximately 2%. A configuration of a slip computer 1 which is suitable for this method is shown in greater detail In FIG. 2. For every wheel, the slip computer 1 receives from the anli-lock braking system-wheel revolution sensory mechanism 5 (two representative probes 5a, 5b are schematically depicted in FIG. 2) a sine-shaped signal which contains the appertaining information regarding the number of wheel revolutions. The slip computer 1 transforms these signals into square wave signals and counts their period via a double counter logic and a significantly higher reference frequency (relative to the square wave signal frequency), which is supplied by a corresponding reference frequency production unit. Through the counting process, the roll-off time for the respective wheel is determined; FIG. 2 is a representative depiction of the roll-off time for a rear-driven wheel, as well as for a front, non-driven wheel. The slip computer 1 transmits the roll-off time information to the staging memory, from which the information is accessed by the master computer 4. In order to guarantee an error free match of the respective longitudinal force of the tires test data and the slip test data in order to form the corresponding longitudinal force of the tires-slip test data pairs, the slip computer 1 sends corresponding trigger impulses to the analog/digital transformer 2.

Figure 3:
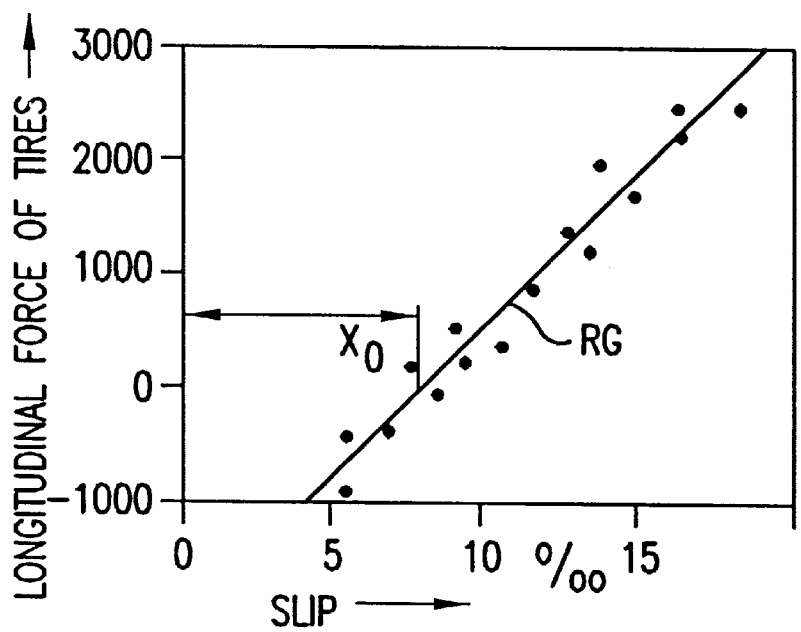
FIG. 3 shows a section of the longitudinal force of the tires-slip performance graph in the micro-slip range, with recorded test data pairs and a linear regression curve for the indirect, relative determination of tire pressure via the device depicted in FIG. 1.
Figure 4:
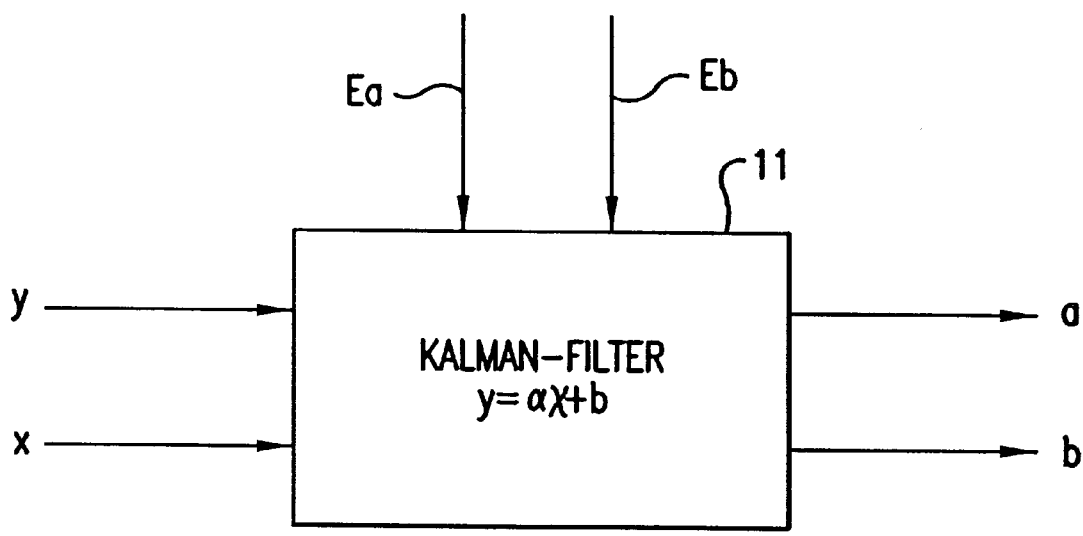
FIG. 4 is a block diagram of a Kalman filter, which can be implemented in an evaluation computer, for the determination of a compensation curve.

FIGS. 3 and 4 show the determination of the relative tire pressure in greater detail. Various longitudinal force of the tires-slip test data pairs, which are representative of the particularly interesting micro-slip range, are plotted in FIG. 3 as data points in the longitudinal force of the tires-slip performance graph. For these recorded test data pairs, the master computer 4 determines a compensation curve (in particular in the form of a linear regression curve RG), because the functional relationship between the longitudinal force of the tires and the slip can be assumed to approximate a linear relationship in this micro-slip range. The determination of the regression curve RG occurs with the help of the known technique of linear regression.

If required, other methods may be used for determining a compensation curve. Thus, as a first alternative to a current force-slip test data pair, a linear equation can be constructed, and for a second current force-slip test data pair, a second linear equation in which the slope and the distance between the axes represent the parameters which can be optimized can also be constructed. The two unknown parameters can be determined analytically via the two linear equations in which primarily that axis intercept is of interest, which determines the unknown true calibration factor k. For practical reasons, the computation is constantly repeated, and the results are averaged using a suitable filter.

A further possibility for determining the compensation curve is the utilization of a Kalman filter 11, which is known, for example, from satellite navigation (as depicted in FIG. 4) and can be implemented in the master computer 4. The Kalman filter 11 is supplied with the longitudinal force of the tires-slip test data as input variables x or y, respectively. The Kalman filter 11 then determines a compensation curve which best approximates the input test data pairs as a polynomial of the n-th degree, where n=1 is chosen to illustrate a simple example, i.e., a straight line y=ax+b, with the optimizable parameters slope a and y-axis intercept b. In the method according to the invention, the filtering components of the Kalman filter 11 can be independently adjusted for the slope parameter a and the axis intercept parameter via corresponding adjustment signals Ea, Eb. The Kalman filter supplies the optimized estimates for the slope a and the y-axis intercept b as outputs.

After the compensation curve has been determined, in one or the other of the above described manners, its x-axis intercept $x_0$ is determined (as depicted in FIG. 3) using the linear regression curve RG. When the compensation curve is a straight line, with the linear equation $F=c_1 l+c_2$, the connection between the longitudinal force of the tires F (as a function of the slip l with the optimized slope c1) and the optimized y-axis intercept $c_2$ for the compensation curve's offset value $x_0$ results in the relationship $$x_0 = -c_2/c_1.$$

The resulting offset value x equals a sham slip, resulting from a de-calibration, i.e., the faulty determination of the dynamic roll radii of the wheels involved, and consequently of the corresponding calibration factor. The precondition for this is that other sham slip effects (in particular cornering effects) are eliminated. The cornering effects can, for example, be suppressed by considering longitudinal force of the tLres-slip test data pairs for the evaluation only when a sufficient degree of straight-line driving is given. Alternatively, the cornering effects can be eliminated by using a larger number of test data pairs, which are recorded over a longer driving distance, because during longer driving distances the vehicle (on average) moves in a straight line such that the deviations which are caused by cornering are eliminated during the determination of the compensation curve. As a further alternative, it is possible to record (as test data) the respective degree of cornering, and to determine the thus created geometric sham slip part and to subtract it from the slip test data.

With the above mentioned definitions ($\lambda=1-kt_a/t_n$ for the slip λ and $k=r_n/r_a$ for the calibration factor k), a new calibration factor $k_{new}$ can be derived from the offset value $x_0$ as a result. By replacing the calibration factor $k_{old}$ (which was previously used), with the relationship $$k_{new} = k_{old}/(1-x_0),$$

with which the de-calibration is overcome, the adjustment of the number of revolutions of the wheel between a driven and a non-driven wheel is achieved. The new calibration factor $k_{new}$ designates the new value of the dynamic wheel radiuses' relationship as $k_{new}=r_n/r_a$, from which in turn the relative tire pressure of the two wheels can be determined such that (in particular) a disproportionate loss of pressure in one wheel in relation to the other can be recognized. To accomplish this, for example, the master computer 4 can determine whether the calibration value changes to a value which lies outside of predetermined tolerances, which it then interprets correctly as a disproportional loss of tire pressure and thus sends the corresponding warning signal 10. In addition, it also indicates which wheel is losing tire pressure.

With the described method according to the invention, it is apparent that such losses of tire pressure between a driven and a non-driven wheel can be recognized, which lead to a slip de-calibration of only approximately 0.5%. As a result, particularly for trucks with nominal pressure values in the range of 6 bar to 8 bar, losses of pressure of 10% and more can be recognized with a high degree of reliability.

On the basis of the above described measurement of the relative tire pressure between a driven and a non-driven wheel, further measures may be taken depending on the specific drive employed. First, the described relative tire pressure determination can be conducted for the two wheels on the same side of the vehicle, as well as for the two diagonal pairs of wheels of a four-wheel vehicle. Each wheel is thus doubly involved in the relative tire pressure determination, which increases the reliability of the pressure measurement. A warning of a loss of pressure takes place (in this case) when the pressure determination for the wheels on the same side, as well as for diagonal wheel pairs, indicates the loss of pressure.

Alternatively, in addition a pressure determination for wheel pairs on the same axle can be provided, and a warning of a loss of tire pressure takes place only when this condition is also indicated for the wheels on the same axle. Otherwise, as mentioned above, by attaching an absolute pressure sensor to at least one wheel of the vehicle, the absolute tire pressure for this wheel can be determined, and on the basis of this reference value absolute pressure values can be derived for all wheels from the previously determined relative tire pressure values. Furthermore, it is possible to calibrate the number of wheel revolutions by axle. The cornering effects can be suitably eliminated (as described above), for example, via a sliding average value formation of the determined number of wheel revolutions on the same axle over a sufficiently long time period.

Because the loss of tire pressure occurs over a longer period of time, in contrast to cornering, it can be distinguished in this manner from cornering effects without any problems. Alternatively, depending on the cornering direction, changes in the wheel radius relationships on the front and rear axle can be detected, and as a result the degree of cornering can be detected, in order to weight more or less heavily the results for the respective driving phase (according to the degree of cornering).

A further option takes into consideration the effect of the vehicle dynamics. For the calibration by axle, relatively little transverse dynamics are useful. For a same-sided calibration, however, a relatively large degree of longitudinal dynamics is useful. Based on this, dynamic factors for the evaluation of the vehicle's longitudinal and transversal dynamics can be developed to suitably control the number of the wheel revolutions' algorithm. The longitudinal dynamics can be derived from the vehicle's acceleration, which can be calculated from the signals of the number of wheel revolutions and the changes in the propulsive force. The transversal dynamics are determined by the incidence of cornering in a predetermined time period.

In addition, it is possible to take into consideration the wheel load. A change in the wheel load causes changes in the same direction for the wheel radius relationship, both for the same-sided wheel pairs and for the diagonally opposed pairs of wheels. Tests additionally show that the slope $c_1$ of the longitudinal force of the tires-slip curve is approximately proportional to the wheel load. As the result of recognizing this relationship, it is possible to determine a wheel load via measuring the slope of the longitudinal force of the tires-slip compensation curve such that the effect of changes in the wheel load on determining the tire pressure can be eliminated. If necessary, the present system can be expanded via a so-called system observer, for example, a fuzzy-control module. This observer registers all input values which are fed to it, and sends a warning signal of the loss of tire pressure only after the input data shows an unequivocal tendency and a subsequent redundancy test have commenced. Disturbance variables and system fluctuation conditions can thus be eliminated, which improves both the precision and the reliability of the system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for monitoring tire air pressure of wheels of an automobile having driven and non-driven wheels, each of said wheels including an inflatable tire, said method, comprising the steps of:

for at least one driven wheel of the automobile, recording measured data pairs comprising values for slip and for an associated longitudinal force of tires, while operating the automobile;

determining a characteristic curve for the recorded longitudinal force of tires-slip measured data pairs;

determining a zero intercept offset value of the characteristic curve, which offset value is equal to a slip value indicated by the characteristic curve corresponding to a zero longitudinal force of the tires value;

determining a wheel radius relationship between at least one non-driven wheel and the at least one driven wheel based on the offset value;

determining relative tire pressure between said at least one non-driven wheel and said at least one driven wheel based on said wheel radius relationship;

directly measuring absolute tire air pressure on at least one wheel; and using the absolute tire air pressure as a reference pressure value to determine tire air pressure of at least one other wheel.

2. The method according to claim 1, wherein the characteristic curve is determined as one of a straight line through two recorded longitudinal force of tires-slip measured data pairs and an straight-line approximation for more than two recorded longitudinal force of tires-slip measured data pairs.

3. The method according to claim 1, further comprising the steps of:

determining the relative tire air pressure for longitudinal and diagonal pairs of wheels of the automobile.

4. The device according to claim 1, further comprising:

a tire pressure sensory mechanism for measuring the tire air pressure of at least one of the vehicle's wheels;

wherein the evaluating means uses the tire air pressure of the respective wheel, measured by the tire pressure sensory mechanism, as a reference pressure value for measuring absolute tire air pressure for at least one other wheel via relative tire air pressure value for a respective wheel.

5. Method for monitoring tire air pressure of wheels of an automobile having driven and non-driven wheels, each of said wheels including an inflatable tire, said method, comprising the steps of:

for at least one driven wheel of the automobile, recording measured data pairs comprising values for slip and for an associated longitudinal force of tires, while operating the automobile;

determining a characteristic curve for the recorded longitudinal force of tires-slip measured data pairs;

determining a zero intercept offset value of the characteristic curve, which offset value is equal to a slip value indicated by the characteristic curve corresponding to a zero longitudinal force of the tires value;

determining a wheel radius relationship between at least one non-driven wheel and the at least one driven wheel based on the offset value;

determining relative tire pressure between said at least one non-driven wheel and said at least one driven wheel based on said wheel radius relationship;

calculating a slope of the characteristic curve; and determining a wheel load using the calculated slope.

6. The method according to claim 5, wherein the characteristic curve is determined as one of a straight line through two recorded longitudinal force of tires-slip measured data pairs and an straight-line approximation for more than two recorded longitudinal force of tires-slip measured data pairs.

7. The method according to claim 6, wherein the two recorded longitudinal force of tires-slip measured data pairs are within a micro-slip range having slip values smaller than 2%.

8. The method according to claim 6, further comprising the step of:

determining the relative tire air pressure for longitudinal and diagonal pairs of wheels of the automobile.

9. The method according to claim 5, further comprising the step of:

determining the relative tire air pressure for longitudinal and diagonal pairs of wheels of the automobile.

10. The method according to claim 5, wherein the characteristic curve is determined as one of a straight line through two recorded longitudinal force of tires-slip measured data pairs and an straight-line approximation for more than two recorded longitudinal force of tires-slip measured data pairs.

11. The method according to claim 5, further comprising the step of:

determining the relative tire air pressure for longitudinal and diagonal pairs of wheels of the automobile.

12. A device for determining tire air pressure of wheels of a vehicle, each of said wheels including an inflatable tire, said device comprising:

means for recording slip and corresponding longitudinal force of tires values as respective longitudinal force of tires-slip measured data pairs for at least one driven wheel while driving;

means for determining for each measured data pair, an associated cornering degree of said vehicle, for determining a resultant geometric sham slip value based on said cornering degree, and for correcting recorded slip of said measured data pair by subtracting said sham slip value;

evaluating means for determining a characteristic curve, based at least on a part of the recorded and corrected longitudinal force of tires-slip measured data pairs;

means for determining a zero intercept offset value of the characteristic curve, which offset value is equal to a slip value indicated by the curve corresponding to a zero longitudinal force of the tires value;

means for determining a wheel radius relationship between a non-driven wheel and the at least one driven wheel, based on the offset value; and means for determining a relative tire air pressure of the wheels of the automobile, based on the wheel radius relationship.

* * * * *